(12) United States Patent
Gallay et al.

(10) Patent No.: US 7,307,830 B2
(45) Date of Patent: Dec. 11, 2007

(54) CAPACITOR WITH BATTERY FORM FACTOR HOUSING

(75) Inventors: Rolland Gallay, Farvagny-le-Petit (CH); Daniel Schlunke, Châtonnaye (CH); Richard Smith, San Diego, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 0 days.

(21) Appl. No.: 10/766,727

(22) Filed: Jan. 27, 2004

(65) Prior Publication Data

US 2005/0078432 A1 Apr. 14, 2005

Related U.S. Application Data

(60) Provisional application No. 60/510,327, filed on Oct. 10, 2003.

(51) Int. Cl.
*H01G 9/00* (2006.01)
(52) U.S. Cl. ............ 361/502; 361/503; 361/504; 361/512; 361/516; 429/231.1; 429/120
(58) Field of Classification Search ........ 361/502–504, 361/508–512, 516–519, 523–528; 429/120, 429/231.1, 231.4
See application file for complete search history.

(56) References Cited

U.S. PATENT DOCUMENTS

| | | | | |
|---|---|---|---|---|
| 5,498,489 A | * | 3/1996 | Dasgupta et al. | 429/152 |
| 5,554,918 A | * | 9/1996 | Harats et al. | 429/49 |
| 5,862,035 A | * | 1/1999 | Farahmandi et al. | 361/502 |
| 6,328,769 B1 | * | 12/2001 | Oweis et al. | 29/623.1 |
| 6,433,997 B1 | * | 8/2002 | Noguchi et al. | 361/511 |
| 6,509,588 B1 | * | 1/2003 | O'Phelan et al. | 257/209 |
| 6,660,428 B2 | * | 12/2003 | Hall | 429/120 |
| 6,870,725 B2 | * | 3/2005 | Sakata et al. | 361/302 |
| 2005/0083021 A1 | * | 4/2005 | Mahon | 320/166 |

* cited by examiner

*Primary Examiner*—Nguyen T. Ha
(74) *Attorney, Agent, or Firm*—Hensley Kim & Holzer, LLC (57) ABSTRACT

High reliable energy density capability of double-layer capacitor electrode technology now enables the use of capacitors as supplements to, or replacements for, battery technologies. In one application, when sized to a standard battery form factor, the large end terminal surface areas of such form factors enable that the energy density of capacitors can now be safely used as direct drop-in replacements for batteries.

28 Claims, 6 Drawing Sheets

CAPACITOR WITH BATTERY FORM FACTOR HOUSING

RELATED APPLICATIONS

This application is related to and claims priority from U.S. Provisional Application No. 60/510,327 filed 10 Oct. 2003, which is commonly assigned and incorporated herein by reference.

FIELD OF THE INVENTION

The subject matter of this application relates generally to capacitor housings and relates more particularly to battery form factor sized capacitor housings and capacitors.

BACKGROUND

Conventional capacitor technology is well known to those skilled in the art. The energy and power density that can be provided by conventional capacitor technology is typically low, for example, conventional capacitors are typically capable of providing less than 0.1 Wh/kg. Applications that require greater energy density from an energy source, therefore, typically do not rely on conventional capacitor technology. The amount of energy delivered by conventional capacitor technology can be increased, but only by increasing the number of capacitors. As the number of conventional capacitors is increased, a larger volume for their housing is required. This volume requirement decreases the potential number of applications in which conventional capacitors may be utilized.

What is needed, therefore, is a capacitor that can be used in a wider range of applications and with a higher energy and/or power density than presently possible.

SUMMARY

A double-layer capacitor is provided in a battery form factor sized housing.

In one embodiment, a capacitor comprises a housing, the housing comprising dimensions that conform to standardized battery dimensions; and a capacitor cell, the cell disposed in the housing and electrically coupled to the housing. The housing may comprise a standard D-cell sized battery form factor. The housing may comprise a C-cell sized battery form factor. The housing may comprise an AA-cell sized battery form factor. The housing may comprise an AAA-cell sized battery form factor. The housing may comprise one or more connectors, wherein the one or more connectors comprise standardized battery connectors. The capacitor cell may comprise a double-layer capacitor. The double-layer capacitor may comprise a dry particle based electrode. The double-layer capacitor may comprise a dry particle based rolled electrode. The double-layer capacitor includes two collectors, wherein the two collectors and the housing comprise substantially the same metal, wherein the collectors are electrically coupled to the housing. The capacitor may comprise a nominal maximum operating voltage of about 2.5 to 3.0 volts. The capacitor may comprise a capacitance of about 0.1 Farad or above. The capacitor may comprise a specific energy density at about 2.5 volts of less than or equal to about 6.5 Wh/kg. The capacitor may comprise a specific power density at about 2.5 volts of less than about 8700 W/kg. The housing may comprise an outer diameter of 33+0/−1 mm and a height of 61.5+0/−2 mm. The housing may comprise a standardized power tool battery sized form factor.

In one embodiment, a double-layer capacitor comprises a housing, the housing comprising dimensions that conform to standardized battery dimensions; and a double-layer capacitor electrically coupled to the housing within the housing.

In one embodiment, a method of making a battery sized capacitor, comprises the steps of providing a double-layer capacitor; providing a battery sized housing, the housing including an open end; inserting the double-layer capacitor into the open end of the housing; and sealing the open end of the housing.

In one embodiment, a capacitor comprises a double-layer capacitor; and housing means for housing the double-layer capacitor. The housing means may comprise a battery form factor sized housing.

In one embodiment, a battery sized energy storage device, comprises a housing; and a rolled electrode, the rolled electrode including two collectors, wherein the two collectors and the housing comprise substantially the same metal, wherein the collectors are coupled to the housing to form an electrical connection. The electrical connection may provide a polarity independent path for application of energy to the energy storage device. The energy storage device may comprise a double-layer capacitor. The electrical connection may receive energy with positive or negative polarity. The electrical connection may be formed by a laser welding process.

Other objects and advantages will be become apparent upon a further reading of the Description and Claims below.

DESCRIPTION

Relatively recently in the energy storage field, a capacitor technology called double-layer capacitor technology, also referred to as ultra-capacitor technology and super-capacitor technology, has been developed. Double-layer capacitors store electrostatic energy in a polarized electrode/electrolyte interface layer that is created by an electrical potential formed between two electrode films when a finished capacitor cell is immersed in an electrolyte. When the electrode films and associated collecting plates are immersed in the electrolyte, a first layer of electrolyte dipole and a second layer of charged species is formed (hence, the name "double-layer" capacitor). Individual double-layer capacitor cells are typically available with values greater than 0.1 Farad and above. For any given housing size, a double-layer capacitor cell may provide on the order of about 100-1000 times, or more, as much capacitance as a conventional capacitor cell. In one embodiment, the energy density provided by a double-layer capacitor is on the order of about 10 Wh/kg, and the power density is on the order of about 10,000 W/kg. Such double-layer capacitors can be obtained from Maxwell Technologies, Inc., located at 9244 Balboa Ave, San Diego Calif. 92123.

Figure 1A:
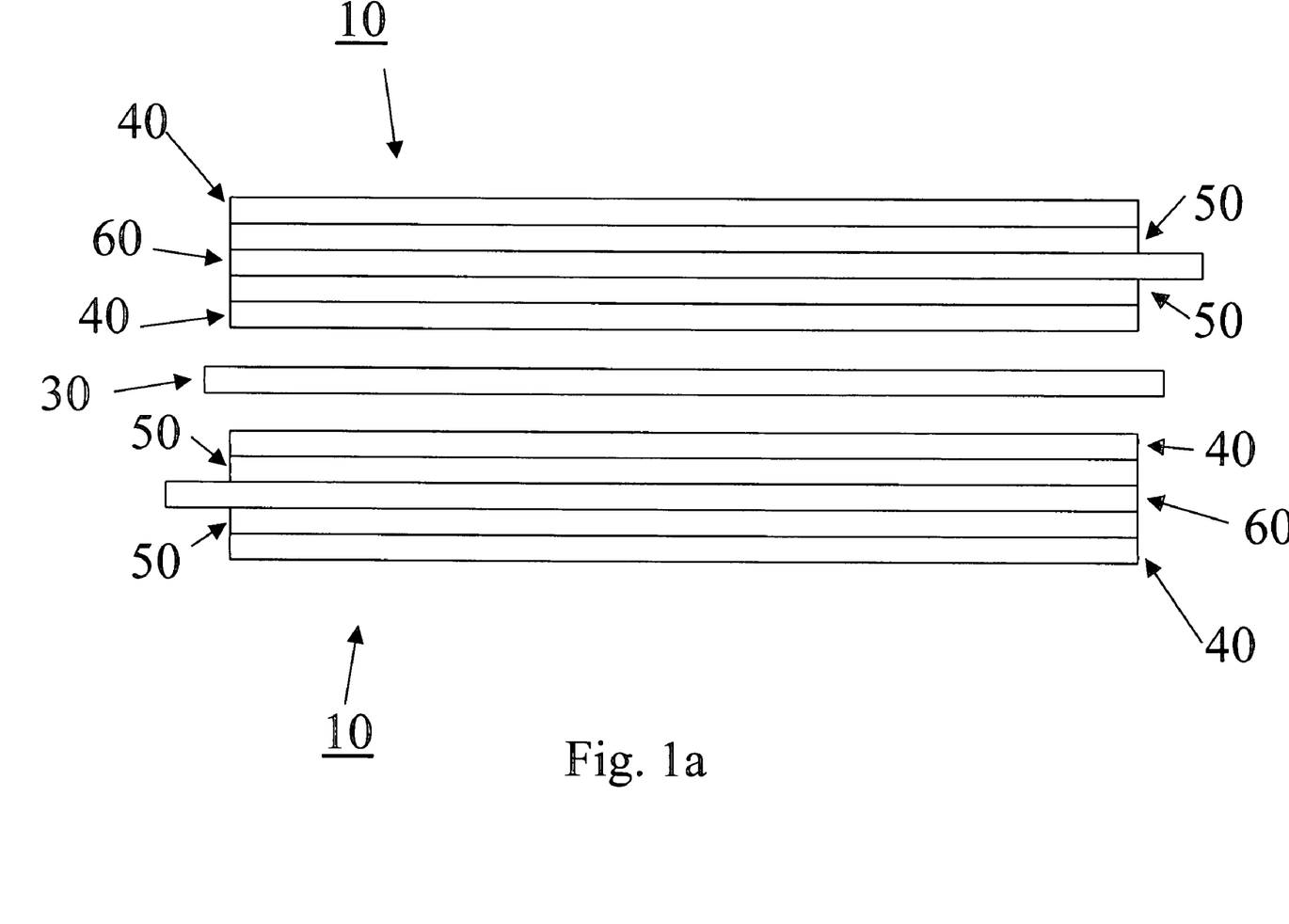
In FIGS. 1a and 1b there are seen structures of a double-layer capacitor.
Figure 1B:
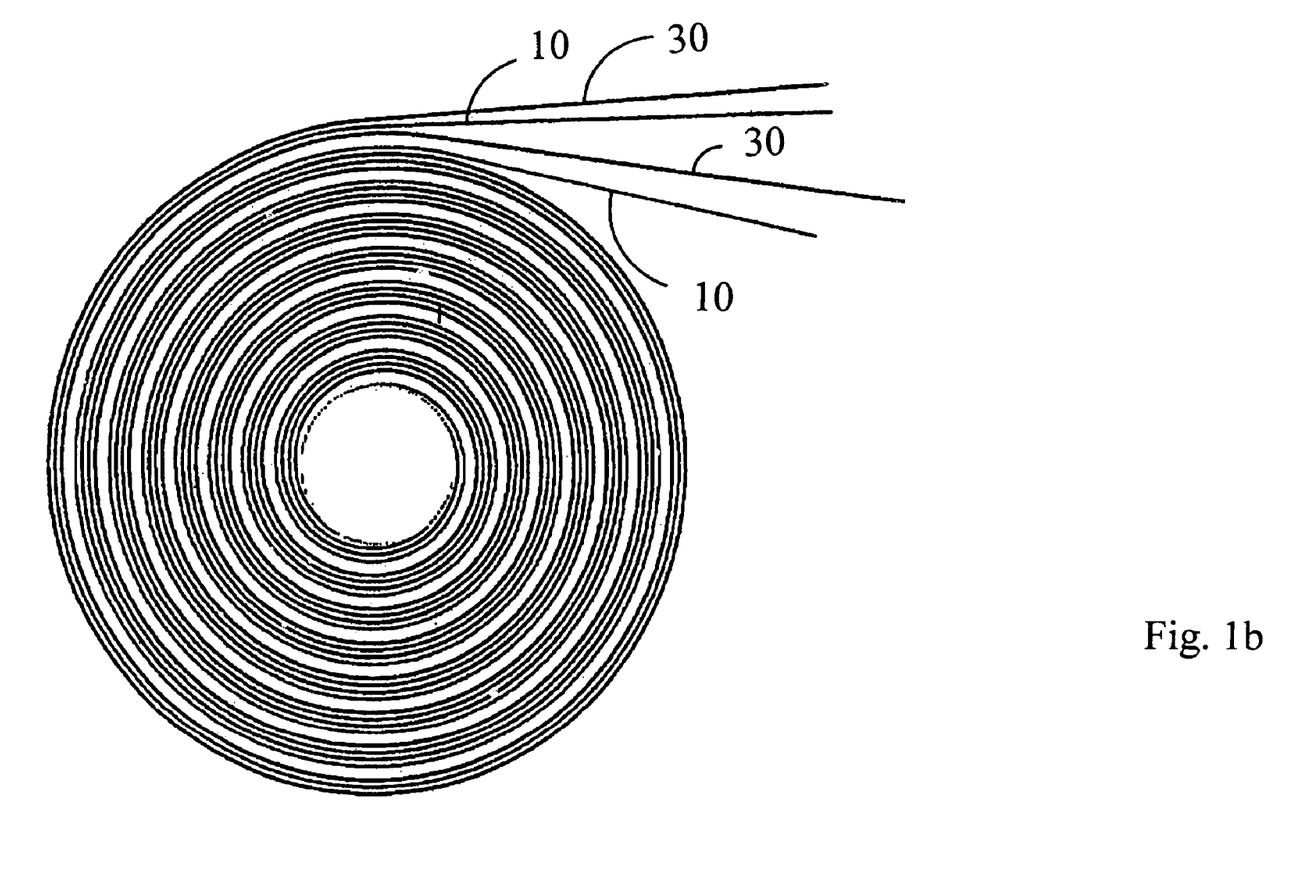

Referring now to FIGS. 1a and 1b, there are seen structures of a double-layer capacitor. In FIG. 1a, two cross-sections of double-layer capacitor structure are formed as long sheets 10 (extending from the cross-sections). Each sheet 10 includes two electrode films 40 and a current collector plate 60. First surfaces of the electrode films 40 are coupled to the collector plate 60. In one embodiment, the electrode films 40 are bonded to a collector plate 60 by a respective conductive adhesive layer 50. In one embodiment, the electrode films 40 are formed from a fibrillized blend of dry Teflon and dry activated and dry conductive carbon particles without use of any solvent, liquid, and the like (i.e., dry particle based) process steps. In one embodiment, the adhesive layers 50 are formed from a blend of dry conductive carbon particles and dry binder particles without use of any solvent, liquid, and the like (i.e., dry particle based) process steps. First and second sheets 10 are separated by a separator 30. The two sheets 10 are rolled together in an offset manner that allows an exposed end of a collector plate 60 of the first sheet 10 to extend in one direction and an exposed end of a collector plate 60 of the second sheet 10 to extend in a second direction. The resulting capacitor geometry is known to those skilled in the art as a jelly-roll and is illustrated in a top view by FIG. 1b. In one embodiment, the current collector plate 60 comprises an etched or roughened aluminum foil of about 30 microns in thickness. In one embodiment, the adhesive layers 50 comprise a thickness of about 5 to 15 microns. In one embodiment, the electrode films 40 comprise a thickness of about 80 to 250 microns. In one embodiment, the paper separator 70 comprises a thickness of about 20-30 microns.

Double-layer capacitors have intrinsic properties that limit their maximum charging voltage to a theoretical value of no more than about 4.0 volts. In one embodiment, a nominal maximum charging voltage of a double-layer capacitor is in a range of about 2.5 to 3.0 volts, which it is identified is a voltage that encompasses the output voltage of a wide range of available rechargeable and non-rechargeable batteries.

Figure 2:
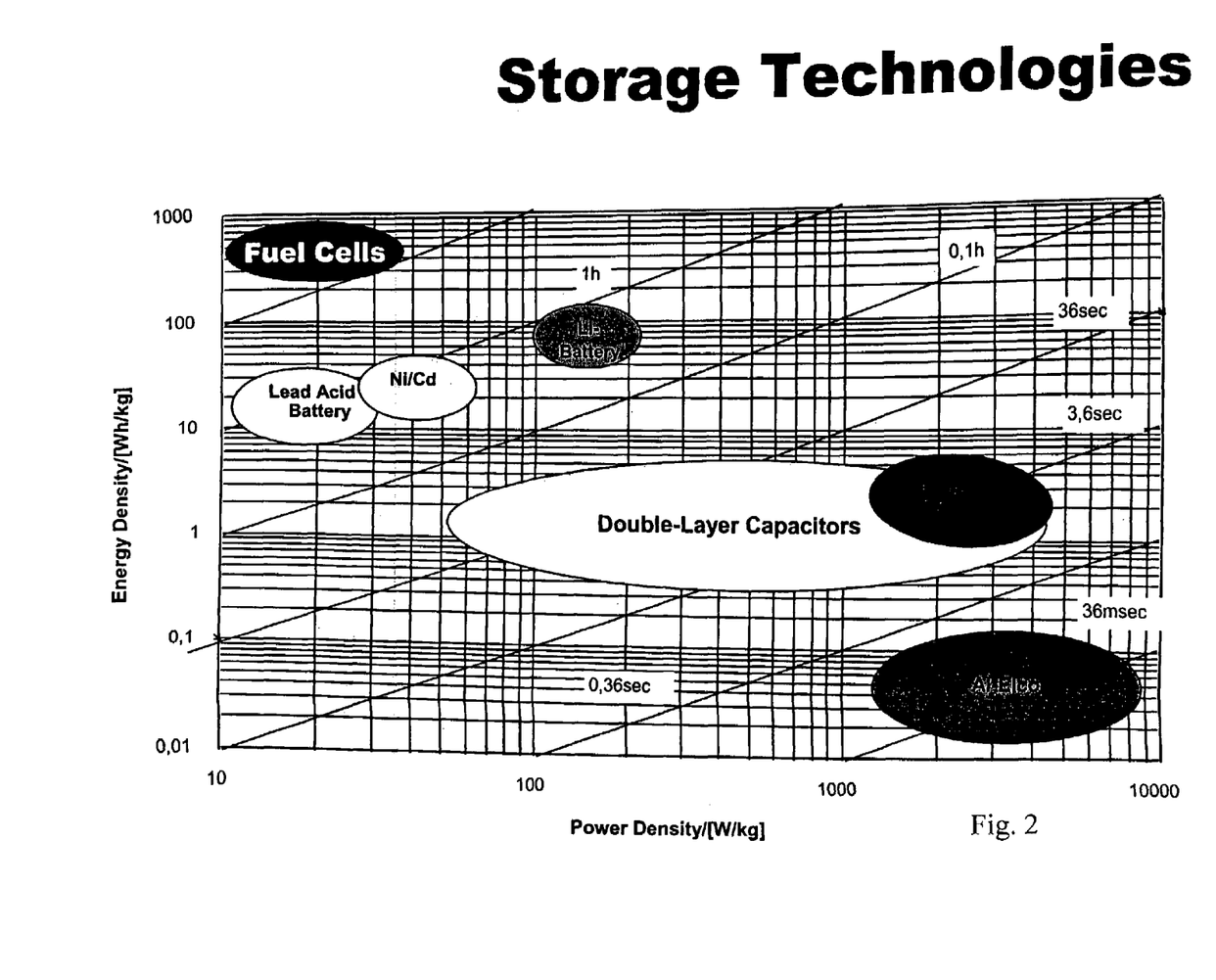
In FIG. 2 there is seen an exemplary chart comparing power density vs. energy density of various energy storage devices.

Referring to FIG. 2, there is seen an exemplary chart comparing power density vs. energy density of various energy storage devices. It is identified that double-layer capacitors can be designed to comprise a power density that is greater than lead acid, and many Nickel Cadmium, Lithium, and Alkaline type batteries; and with an energy density that approaches that of, or overlaps, the energy density available from lead acid, Nickel Cadmium, Lithium, and Alkaline batteries. FIG. 2 is provided for illustration and is not meant to be limiting to the present invention, as changes in technology will occur with time and, thus, change the characteristics of the devices shown in FIG. 2.

Figure 3:
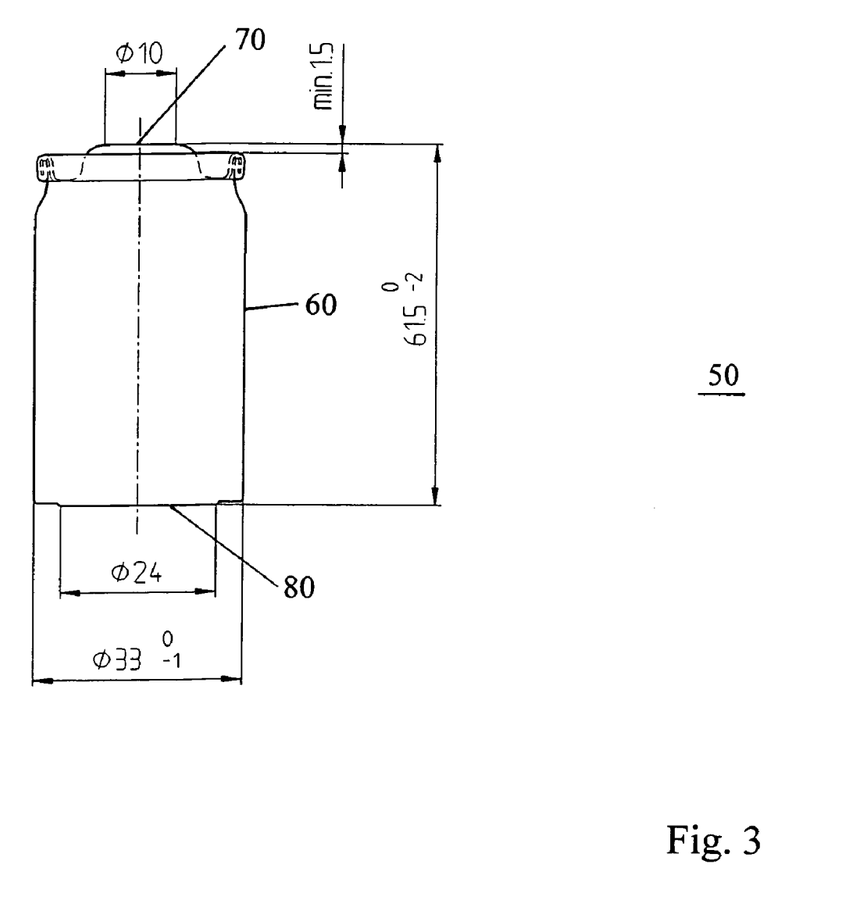
In FIG. 3 there is seen a battery form factor sized capacitor housing.

Referring now to FIG. 3, there is seen a battery form factor sized capacitor housing. In one embodiment, a double-layer capacitor is designed to fit in a battery form factor sized housing 60. Those skilled in the art will understand that standardized battery form factor sized housings may vary within tolerances that have been established and accepted by manufacturers and those skilled in the art. The dimensions of standardized battery form factor sized housings can be obtained from international standards body IEC located at Central Office, 3, rue de Varembé, P.O. Box 131, CH-1211 GENEVA 20, Switzerland. Primary cell form factor standards known to those skilled in the art that are within the scope of the present invention are referenced in International Standard IEC Standard 60086-1-Ed. 9.0, which documents primary batteries with respect to their electrochemical system, dimensions, nomenclature, terminal configurations, markings, test methods, typical performance safety and environmental aspects, and which is incorporated herein by reference. Secondary cell form factor standards known to those skilled in the art that are within the scope of the present invention are referenced in International Standard IEC Standard 61951-1-Ed. 2.0, which documents secondary batteries with respect to their electrochemical system, dimensions, nomenclature, terminal configurations, markings, test methods, typical performance safety and environmental aspects, and which is incorporated herein by reference. Standardized battery form factor housings and terminal dimensions and configurations can also be obtained from American National Standards Institute (ANSI) located at Washington, D.C. Headquarters 1819 L Street, NW (between 18th and 19th Streets), 6th floor Washington, D.C. 20036. ANSI standards for batteries are known by those skilled in the art as ANSI/NEDA standards. For example, an ANSI standard for D-cell sized battery housings is known as ANSI/NEDA 13A, an ANSI standard for C-cell sized battery housings is known as ANSI/NEDA 14A, an ANSI standard for AA-cell sized battery housings is known as ANSI/NEDA 15A, an ANSI standard for D-cell sized battery housings is known as ANSI/NEDA 24A, and an ANSI standard for 9 volt sized battery housings is known as ANSI/NEDA 1604A.

In one embodiment, a battery form factor sized housing manufactured as an Energizer™ brand D-cell sized battery and housing comprises a diameter of about 32.3-34.2 mm and a height of about 59.5-61.5 mm. Accordingly, in one embodiment, a battery form factor sized capacitor housing 60 comprises a diameter of about 33+0/−1 mm and a height of about 61.5+0/−2 mm, which are dimensions that are within the ANSI/NEDA and IEC dimensions for D-cell sized battery housings, and Energizer brand battery D-cell dimensions. It is understood that, D-cell dimensions are illustrative of one possible standardized battery form factor sized housing that is within the scope of the present invention, which should be limited only by the scope of the claims. For example, a C-cell form factor sized capacitor housing can comprise a diameter of about 25.2+0/−1 mm and a height of about 49.0+0/−2 mm, an AA-cell form factor sized capacitor housing can comprise a diameter of about 13.0+0/−1 mm and a height of about 50.0+0/−2 mm, and a AAA-cell form factor sized capacitor housing can comprise a diameter of about 10.0+0/−1 mm and a height of 44.0+0/−2 mm. In one embodiment, a double-layer capacitor in a D-cell form factor sized capacitor housing 60 has been demonstrated to provide 425 F, 3.2 mOhm at about 2.5 Vdc in a 56 g cell and an energy density of about 6.5 Wh/kg and a power density of about 8.7 kW/kg.

In one embodiment, a capacitor housing 60 may be provided with external electrode connections/connectors/terminals 70, 80 similar to, or the same as, those of standardized batteries. Inclusion of battery style terminal ends on a capacitor housing 60 enables that the housing can be provided to easily connect to apparatus that utilize battery style connections of a reverse sex. Because existing standardized battery style connectors, and modules that use them, can be readily obtained from manufacturers, redesign time and costs can be appreciably reduced when implementing one or more of the embodiments described herein.

Standardized battery style connections/connectors/terminals 70, 80 can also be used to connect multiple capacitor housings 60 together. For example, as with batteries, the operating voltage of a double-layer capacitor 50 may be increased by connecting two or more double-layer capacitors in series. The use of standardized battery style connections/connectors/terminals 70, 80 facilitates such series connections. As well, standardized battery style connections/connectors/terminals 70, 80 can be used to facilitate parallel connections. Battery style connections 70, 80 allow easy drop in capacitor replacement of batteries to be made. The benefits and advantages of the embodiments described herein enable easy connection and replacement of battery technology with double-layer capacitor technology, and, thus, increase the number of potential applications that double-layer capacitors can be used in. Furthermore, a change of energy component type, from battery to double-layer capacitor, finds interest in applications where maintenance cost is a key factor, or where cyclability is important.

In one embodiment, it is identified that the ends 70, 80 of a battery form factor sized capacitor housing 60 lend themselves well to a geometrical design that exhibits a relatively large electrically conductive surface area, as compared to conventional capacitor housings, that provide small diameter leads, terminals, etc. For example, in one embodiment, a D-cell battery form factor sized capacitor housing 60 may be designed to comprise conductive end surface area(s) of greater than 90 $mm^2$. Electrical contact through a large surface area of a D-cell form factor sized capacitor housing 60 end allows that high current may flow through the end with minimal electrical loss. Because double-layer capacitors can supply or receive higher current than comparable batteries, the large surface area ends 70, 80 can be used advantageously for this purpose. Large surface area ends 70, 80 also allow that the ends may be provided in many geometrical variations and yet remain within the required dimensions of a particular battery form factor. For example, appropriate dimensioning of the ends 70, 80 may be made to provide large screw-in type connections, mechanical pressure type connections, welding/solder type connections, as well as others that in the capacitor prior art would not be practical or not possible.

Double-layer technology is now capable of being provided with energy and/or power density performance characteristics that approach or exceed those of batteries. Accordingly, it has been identified that double-layer capacitor technology can housed in a standardized battery form factor sized housing to supplement, or substitute for, equivalent sized batteries. Double-layer capacitor technology in a battery form factor sized housing 60 may also improve upon battery technology. For example, a D-cell sized double-layer capacitor 50 can provide many more charge/recharge cycles than may achieved by a D-cell sized rechargeable battery. Because double-layer capacitors utilize an electrostatic storage mechanism, they can be cycled through hundreds of thousands of charges and discharges without performance degradation, which compares with life cycles of less than 1000 for rechargeable batteries.

Although discussed with reference to a D-cell form factor sized housing 60, the present invention is not limited to a D-cell form factor housing and/or standardized battery electrode connections/connectors/terminals 70, 80. For example, one or more of the above identified principles and advantages can be used to effectuate other battery form factor sized capacitor housings and connectors. For example, it is identified that many power tools are now powered by batteries in a power tool specific form factor housing. In one embodiment, double-layer capacitor(s) are housed in such a manufacturer specific housing. Although some double-layer capacitors may not have the energy density of batteries, they do typically have more power density than batteries and, thus, can be used as a short-term substitute for a power tool battery pack. Because a double-layer capacitor based energy source in a battery form factor sized capacitor housing can be recharged more quickly than a battery, for example, on the order of 15 seconds or so, as opposed to the tens of minutes for a battery, double-layer capacitor technology can be utilized as a battery substitute or supplement when re/charge times are critical.

Figure 4:
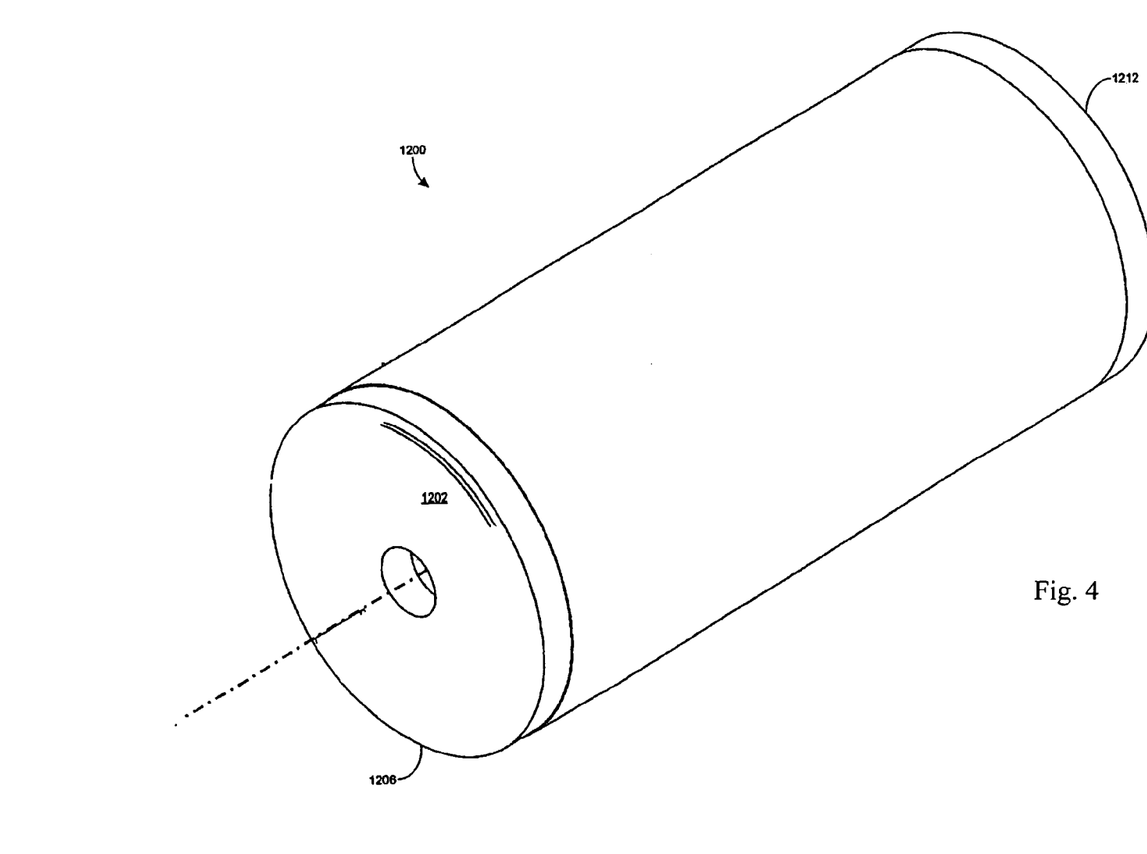
In FIG. 4 there is seen a perspective view of a rolled double-layer capacitor; and In FIG. 5 a rolled double-layer capacitor comprising offset collectors as discussed in FIGS. 1a and 1b is shown housed in a battery form factor sized capacitor housing.

Referring now to FIG. 4, there is seen a perspective view of a rolled double-layer capacitor. As disclosed by FIG. 1b, in one embodiment, ends of one offset collector extend from one end 1212 of a rolled double-layer capacitor 1200, and ends of another offset collector extend (represented by exemplary collector extensions 1202) from another end 1206.

Figure 5:
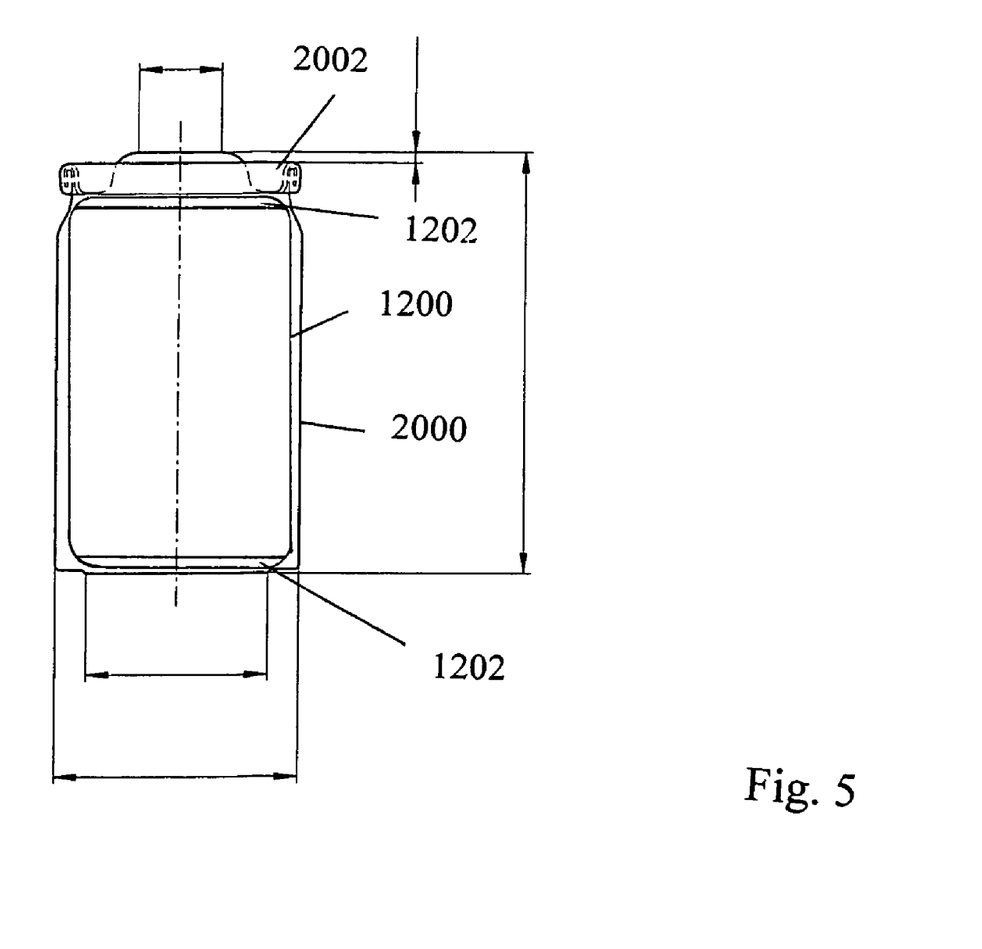

Referring now to FIG. 5 and FIG. 4 as needed, a rolled double layer-capacitor comprising offset collectors as discussed in FIG. 1b is housed in a battery form factor sized capacitor housing. During manufacture, a rolled double-layer capacitor 1200 is inserted into an open end of a battery form factor sized housing 2000, and electrolyte is added within the housing. An insulator is placed along the periphery of the housing 2000 (not shown) at the open end, and a cover 2002 is placed on the insulator. During manufacture, the housing 2000, insulator, and cover 2002 can be mechanically curled together to form a sealed fit around the periphery, which after the curling process is electrically insulated from the cover by the insulator. When disposed in the housing 2000, respective exposed collector extensions 1202 of capacitor 1200 make internal contact with the bottom end of the housing 2000 and the cover 2002. In one embodiment, external surfaces of the housing 2000 or cover 2002 may include or be coupled to standardized connections/connectors/terminals to facilitate electrical connection to the rolled capacitor 1200 within the housing 2000. Contact between respective collector extensions 1202 and the internal surfaces of the housing 2000 and the cover 2002 may be enhanced by a welding, soldering, and/or brazing process. In one embodiment, the welding process may be applied to the housing and cover by externally applied a laser welding process. In one embodiment, the housing 2000, cover 2002, and collector extensions 1202 comprise substantially the same metal, for example, aluminum. In a laser welding embodiment, respective internally abutting aluminum collector extensions 1202 are be bonded to the aluminum housing 2000 and cover 2002 without the use of additional bonding metal. In one embodiment, laser welding is applied to the bottom end of the housing 2000 and to the cover 2002 by a laser beam externally applied to the housing and cover. In this last embodiment, those skilled in the art will identify that because substantially similar housing, cover, and collector metals are bonded to each other, a galvanic effect will not be created at the bonding or welding points. Those skilled in the art will recognize that batteries are typically subject to the galvanic effect at dissimilar anode and cathode metal connection points. Due in part to the galvanic effect, batteries become polarized, and consequently must be connected through their terminals with a correct positive and negative orientation. In one embodiment, because a double-layer capacitor 1200 connected by the laser welding process does not utilize dissimilar metals, a battery form factor sized housing 2000 holding such a capacitor would not initially experience a polarizing effect. Accordingly, a double layer-capacitor 1200 in a battery form factor sized housing 2000 could initially be provided as a substitute for, or a supplement to, an equivalent sized battery, without necessarily needing to take into account the orientation of its terminals, which would further enhance applications that double-layer capacitors could be used in. It is understood, however, that after initial use of a capacitor 1200, for example, after its initial charge cycle, the capacitor 1200 would become polarized because a positive charge would accumulate at one collector plate and a negative charge would accumulate at another collector plate. Unless such a charged capacitor was to be subsequently completely discharged, the established polarization of the capacitor would need to be considered with continued use.

While the particular embodiments described herein are fully capable of attaining the above described advantages and objects of the present invention, it is understood that the description and drawings presented herein represent some, but not all, embodiments of the invention and are therefore broadly representative of the subject matter which is contemplated by the present invention. For example, a double-layer capacitor and/or housing may be designed to conform to a standardized C-cell battery form factor, an AA-cell battery form factor, or an AAA-cell battery form factor. The above identified principles and advantages may be applied to standardized housing of other battery technologies, for example, NiMh, lithium, alkaline, Nicad, sealed lead-acid, and the like. The above identified principles and advantages may also be applied to other batteries and form factors that may be developed and accepted in the future as standardized. It is therefore understood that the scope of the present invention fully encompasses other embodiments that may become obvious to those skilled in the art and that the scope of the present invention is accordingly limited by nothing other than the appended claims.

What is claimed:

1. A capacitor, comprising:
    a housing comprising a first terminal and a second terminal, the housing comprising dimensions that conform to standardized battery dimensions; and
    a capacitor cell disposed in the housing and electrically coupled to the housing, the capacitor cell comprising:
    a first electrode;
    a first current collector coupled the first electrode;
    a second electrode;
    a second current collector coupled to the second electrode; and
    a separator interposed between the first electrode and the second electrode;
    the first electrode,
    the first current collector, the second electrode, the second current collector, and the separator rolled together in a jelly-roll configuration in which the first current collector extends in a first direction and the second current collector extends in a second direction opposite the first direction, wherein the first current collector of the capacitor cell is coupled to the first terminal of the housing and the second current collector is coupled to the second terminal of the housing.

2. The capacitor of claim 1, wherein the housing comprises a standard D-cell sized battery form factor.

3. The capacitor of claim 1, wherein the housing comprises a standard C-cell sized battery form factor.

4. The capacitor of claim 1, wherein the housing comprises a standard AA-cell sized battery form factor.

5. The capacitor of claim 1, wherein the housing comprises a standard AAA-cell sized battery form factor.

6. The capacitor of claim 1, wherein the housing comprises one or more connectors, wherein the one or more connectors comprise standardized battery connectors.

7. The capacitor of claim 1, wherein the capacitor cell comprises a double-layer capacitor.

8. The capacitor of claim 7, wherein the double-layer capacitor comprises a dry particle based electrode.

9. The capacitor of claim 7, wherein the double-layer capacitor comprises a dry particle based rolled electrode.

10. The capacitor of claim 7, wherein the double-layer capacitor includes two collectors, wherein the two collectors and the housing comprise substantially the same metal, and wherein the collectors are electrically coupled to the housing.

11. The capacitor of claim 1, wherein the capacitor comprises a nominal maximum operating voltage of about 2.5 to 3.0 volts.

12. The capacitor of claim 1, wherein the capacitor comprises a capacitance of about 0.1 Farad or above.

13. The capacitor of claim 1, wherein the capacitor comprises a specific energy density at about 2.5 volts of less than or equal to about 6.5 Wh/kg.

14. The capacitor of claim 1, wherein the capacitor comprises a specific power density at about 2.5 volts of less than about 8700 W/kg.

15. The capacitor of claim 2, wherein the housing comprises an outer diameter of 33+0/−1 mm and a height of 61.5+0/−2 mm.

16. The capacitor of claim 1, wherein the housing comprises a standardized power tool battery sized form factor.

17. A double-layer capacitor, comprising:
    a housing, the housing comprising dimensions that conform to standardized battery dimensions; and
    a double-layer capacitor electrically coupled to the housing within the housing, the double-layer capacitor comprising:
    a first electrode;
    a first current collector coupled the first electrode;
    a second electrode;
    a second current collector coupled to the second electrode; and
    a separator interposed between the first electrode and the second electrode;
    the first electrode,
    the first current collector, the second electrode, the second current collector, and the separator rolled together in a jelly-roll configuration in which the first current collector extends in a first direction and the second current collector extends in a second direction opposite the first direction,
    wherein the first current collector of the capacitor cell is coupled to the first terminal of the housing and the second current collector is coupled to the second terminal of the housing.

18. A method of making a battery sized capacitor, comprising the steps of:
    providing a double-layer capacitor comprising:
    a first electrode;
    a first current collector coupled the first electrode;
    a second electrode;
    a second current collector coupled to the second electrode; and
    a separator interposed between the first electrode and the second electrode; the first electrode,
    the first current collector, the second electrode, the second current collector, and the separator rolled together in a jelly-roll configuration in which the first current collector extends in a first direction and the second current collector extends in a second direction opposite the first direction;

providing a standard battery-sized housing, the housing including an open end;

inserting the double-layer capacitor into the open end of the housing; and sealing the open end of the housing, wherein the first current collector is coupled to a first terminal of the housing and the second current collector is coupled to a second terminal of the housing.

19. A capacitor, comprising:

a double-layer capacitor comprising;
- a first electrode;
- a first current collector coupled the first electrode;
- a second electrode;
- a second current collector coupled to the second electrode; and
- a separator interposed between the first electrode and the second electrode;

the first electrode, the first current collector, the second electrode, the second current collector, and the separator rolled together in a jelly-roll configuration in which the first current collector extends in a first direction and the second current collector extends in a second direction opposite the first direction; and housing means for housing the double-layer capacitor, wherein the housing means comprises a battery form factor sized housing and the first current collector is coupled to a first terminal of the housing and the second current collector is coupled to a second terminal of the housing.

20. A battery sized energy storage device, comprising:

a standard battery-sized housing; and a jelly-rolled electrode, the jelly-rolled electrode including a first collector extending in a first direction from the jelly-rolled electrode and a second collector extending in a second opposite direction from the jelly-rolled electrode, wherein the two collectors and the housing comprise substantially the same metal, wherein the first collector is electrically coupled to a first terminal of the housing and the second electrode is electrically coupled to a second terminal of the housing.

21. The battery sized housing of claim 20, wherein the electrical connection provides a polarity independent path for application of energy to the energy storage device.

22. The battery sized housing of claim 20, wherein the energy storage device comprises a double-layer capacitor.

23. The battery sized housing of claim 20, wherein the electrical connection may receive energy with positive or negative polarity.

24. The battery sized housing of claim 20, wherein the electrical connection comprises a laser weld.

25. A capacitor comprising:

a cylindrical housing comprising standardized battery form factor dimensions, the cylindrical housing comprising a first terminal on a first end of the cylindrical housing and a second terminal on the second end of the cylindrical housing opposite the first end of the cylindrical housing; and a jelly-roll capacitor cell disposed within the cylindrical housing, the jelly-roll capacitor cell comprising a first collector extending from a first side of the capacitor cell and electrically connected to the first terminal of the cylindrical housing and a second collector extending from a second side of the capacitor cell opposite the first side and electrically connected to the second terminal of the cylindrical housing.

26. The capacitor of claim 25, wherein the capacitor cell comprises a double-layer capacitor.

27. The capacitor of claim 25, wherein the capacitor cell comprises a rolled electrode capacitor cell.

28. The capacitor of claim 25, wherein the first terminal may receive energy with positive or negative polarity.

* * * * *